(12) United States Patent
Levandoski et al.

(10) Patent No.: US 8,013,314 B2
(45) Date of Patent: Sep. 6, 2011

(54) CURABLE SILICONE COMPOSITIONS INCORPORATING A FLUORESCENT DETECTION SYSTEM

(75) Inventors: Michael P. Levandoski, Bristol, CT (US); Hsien-Kun Chu, Wethersfield, CT (US); Richard Corrao, Manchester, CT (US)

(73) Assignee: Henkel Corporation, Rocky Hill, CT (US)

( * ) Notice: Subject to any disclaimer, the term of this patent is extended or adjusted under 35 U.S.C. 154(b) by 699 days.

(21) Appl. No.: 11/720,611

(22) PCT Filed: Nov. 18, 2005

(86) PCT No.: PCT/US2005/041894
§ 371 (c)(1),
(2), (4) Date: Jun. 1, 2007

(87) PCT Pub. No.: WO2006/060189
PCT Pub. Date: Jun. 8, 2006

(65) Prior Publication Data
US 2009/0166559 A1   Jul. 2, 2009

Related U.S. Application Data

(60) Provisional application No. 60/632,247, filed on Dec. 1, 2004.

(51) Int. Cl.
*H05B 33/00* (2006.01)
*C08F 2/46* (2006.01)
*B32B 37/12* (2006.01)
(52) U.S. Cl. ............ 250/484.4; 522/28; 522/64; 522/99
(58) Field of Classification Search ............ 522/28, 522/64, 99
See application file for complete search history.

(56) References Cited

U.S. PATENT DOCUMENTS

| | | | |
|---|---|---|---|
| 4,111,890 A | | 9/1978 | Getson et al. |
| 4,528,081 A | | 7/1985 | Lien et al. |
| 4,699,802 A | | 10/1987 | Nakos et al. |
| 4,710,523 A | * | 12/1987 | Lechtken et al. ............... 522/14 |
| 4,966,922 A | | 10/1990 | Gross et al. |
| 5,162,390 A | * | 11/1992 | Tilley et al. ..................... 522/64 |
| 5,227,410 A | * | 7/1993 | Eckberg et al. ................ 522/75 |
| 5,240,971 A | | 8/1993 | Eckberg et al. |
| 5,300,608 A | * | 4/1994 | Chu et al. ........................ 528/14 |
| 5,302,627 A | * | 4/1994 | Field et al. ...................... 522/13 |
| 5,348,986 A | | 9/1994 | Chu et al. |
| 5,498,642 A | | 3/1996 | Chu et al. |
| 5,516,812 A | | 5/1996 | Chu et al. |
| 5,663,269 A | | 9/1997 | Chu et al. |
| 5,707,781 A | * | 1/1998 | Wilczak ..................... 430/281.1 |
| 5,792,589 A | | 8/1998 | Udagawa et al. |
| 5,801,884 A | * | 9/1998 | Sato et al. ..................... 359/620 |
| 6,080,450 A | | 6/2000 | Cantor |
| 6,103,453 A | | 8/2000 | Prantl et al. |
| 6,140,444 A | | 10/2000 | Levandoski et al. |
| 6,207,727 B1 | * | 3/2001 | Beck et al. ....................... 522/64 |
| 6,251,962 B1 | | 6/2001 | Desobry |
| 6,323,253 B1 | * | 11/2001 | Bennington .................... 522/16 |
| 6,451,870 B1 | | 9/2002 | DeCato et al. |
| 6,627,672 B1 | | 9/2003 | Lin et al. |
| 6,664,024 B1 | * | 12/2003 | Nguyen et al. ............. 430/280.1 |
| 7,213,918 B2 | * | 5/2007 | Phelan .......................... 351/177 |
| 2004/0034116 A1 | * | 2/2004 | Wojciak ......................... 522/71 |

OTHER PUBLICATIONS

International Search Report dated Jul. 19, 2006.

* cited by examiner

*Primary Examiner* — Robert Loewe
(74) *Attorney, Agent, or Firm* — Steven C. Bauman

(57) ABSTRACT

The present invention relates to curable silicone compositions which include a fluorescent agent for detection purposes and which have a cure system which enables the silicone compositions to possess improved depth of cure. The silicone compositions are photocurable, and may also be moisture or heat curable.

20 Claims, No Drawings

CURABLE SILICONE COMPOSITIONS INCORPORATING A FLUORESCENT DETECTION SYSTEM

RELATED U.S. APPLICATION DATA

This application claims the benefit on an earlier filing date from International Patent Application No. PCT/US2005/041894, filed Nov. 18, 2005, which claims the benefit of an earlier filing date from U.S. Provisional Application No. 60/632,247, filed Dec. 1, 2004.

BACKGROUND OF THE INVENTION

1. Field of the Invention

The present invention relates to curable silicone compositions. More specifically, the present invention relates to curable silicone compositions having an improved depth of cure and which incorporate a fluorescent agent detection system.

2. Brief Description of Related Technology

A variety of silicone compositions have been developed that may be used as sealants, gaskets, conformal coatings, potting compounds, encapsulants, and the like. Among the numerous silicone compositions that have been created, some depend on atmospheric humidity and/or moisture to be present on the substrate to which the composition is applied, for their cure. Although such moisture-curing silicone systems can provide good physical properties and performance when fully cured, they suffer the disadvantage that the moisture curing process is relatively slow.

In consequence, silicone compositions that depend on other curing processes have been developed which are significantly faster than those that undergo a moisture-curing process. In particular, photo-curable (e.g. UV-curable) silicones have been developed which offer a fast curing speed, far superior to conventional moisture-curing silicones. These silicone compositions may include a photoinitiator that provides a faster and more effective cure. Silicone compositions that are both moisture-curable and photo-curable have also been developed that provide a rapid cure. Examples of these are described in several patents assigned to Henkel Corporation, including U.S. Pat. Nos. 5,663,269, 5,516,812, 5,498,642 and 5,348,986 to Chu et al.; 6,451,870 to DeCato et al; 6,140,444 to Levandoski et al.; 4,528,081 to Lien et al.; and 4,699,802 to Nakos et al., all of which are hereby expressly incorporated by reference.

In addition to cure speed, cure-through-depth (CTD), also sometimes referred to as cure-through-volume (CTV), is an important feature to many applications. Conventional photo- and/or dual curing silicones have shown only limited depth of cure. Many silicone compositions, and particularly photo-curable silicone compositions, are unable to fully cure at depths greater than 5-8 mm. Many applications, such as potting and gap filling of electronic components require compositions which can effectively cure through relatively large depths or volumes.

While a variety of different photoinitiators are generally known as being useful for curing silicones, only a limited number are known to have produced a substantial increase in CTD. One such case is disclosed in U.S. Pat. No. 6,627,672 to Lin et al., which discloses a photo-curable silicone composition containing a premix which includes an acylphosphine oxide and at least one polar carrier. This patent also discloses a dual photo/moisture curing silicone composition which includes a photo/moisture curable silicone, a premix including a first photoinitiator comprising an acylphosphine oxide, a second photoinitiator different than the first photoinitiator and at least one polar solvent.

Polymerizable silicone compositions are frequently clear or transparent when cured. As a result, the cured compositions may be difficult to see. Thus, the presence of the silicone, or the quality of the application coverage is therefore hard to access and/or correct.

Various agents have been incorporated into polymer systems in general for detection purposes. Fluorescing agents have been incorporated into curable compositions to provide a non-destructive method of inspection and identification of cured films, and ensuring proper coating of the composition on an article. For example, U.S. Pat. No. 6,080,450 to Cantor discloses a polymerizable acrylate formulation which contains a fluorescing agent. Dyes and pigments are also known agents which are used to provide visible identification means to curable resins. Such agents, however, are not necessarily useful in photo-curable resins because they impair the ability of light to initiate polymerization. Moreover, fluorescing agents are known to reduce the depth of cure in photo-cure compositions since they absorb the light required for polymerization. As a result, photo-curable silicone resins have not included fluorescent agents. Additionally, high-depth photo-curing silicones would be expected to be particularly hampered by the incorporation of a fluorescent agent.

Accordingly, there is a need for a photo-curable silicone having improved CTD and which permits detection of the cured polymer through the incorporation of a fluorescent agent.

SUMMARY OF THE INVENTION

The present invention provides curable silicone compositions which may be cured using light, moisture or a combination of light and moisture. Optionally, heat may also be used alone or in addition to light and/or moisture to accelerate or initiate cure of the compositions. The inventive compositions include a fluorescent detection agent and a cure system, the combination of which provide for a cured product which is readily detectable due to fluorescence and which has the capability of curing through large depths. Desirably, the silicone polymer composition is photo-curable under both visible light and ultraviolet (UV) light conditions, and advantageously may include moisture curing groups to enhance curing options and provide additional application alternatives.

CTD has traditionally been a challenge with photo-curing silicone compositions, largely due to the difficulty in penetrating the full depth of the composition with the light necessary for cure. Incomplete cure affects the performance properties and is generally undesirable. The incorporation of an agent, such as a fluorescent agent, which competes with the photo-cure system would appear contrary to convention since the ability to cure, and in particular to cure at commercially acceptable depths, would be expected to be further hampered by the presence of the fluorescent agent. The present invention overcomes this difficulty by further incorporating a solid photoinitiator in combination with a solvent. This combination provides a detectable silicone composition which has the ability to fully photo-cure at high depths.

In one aspect of the present invention there is included a curable silicone composition, a photoinitiator and a fluorescent dye. The photoinitiator may be useful both in the visible and UV light range. The photoinitiator may be a solid photoinitiator and may include a solvent to facilitate its incorporation into the composition.

In another aspect of the present invention, there is provided a curable silicone composition, which includes: a) a photo-curable silicone resin; b) a solid photoinitiator; and c) a non-polar solvent for the solid photoinitiator. The composition may also include a fluorescent dye.

In another aspect, the present invention relates to a curable silicone composition, which includes: a) a curable silicone resin; and b) a cure system comprising a solid photoinitiator; and a fluorescent dye. The composition may further include a solvent for the photoinitiator.

A further aspect of the present invention relates to a method of preparing a photo curable silicone composition, which includes: a) providing a curable silicone resin; and b) mixing the curable silicone resin with a cure system that includes i) a solid photoinitiator, and ii) a fluorescent dye.

Still another aspect of the present invention relates to a silicone composition that includes a) the reaction product of a photo-curable silicone resin; b) a cure system that includes a premix of a solid photoinitiator and a solvent for the solid photoinitiator; and a fluorescent dye. Desirably, the solvent may be a non-polar solvent as described later herein.

In another aspect, a method for detecting the presence of a silicone composition including, providing an inventive silicone composition onto a substrate; exposing the silicone composition to a light of wavelength appropriate to trigger an optical response by the fluorescent agent without causing photo curability of the silicone composition; and observing the subsequent fluorescent emission as an indication of the presence of the silicone composition. The choice of wavelength and the amount of time of light exposure can be selected such that the fluorescent agent can absorb, reflect or otherwise be caused to trigger an optical response in the form of fluorescent emission. In cases where the composition is not yet cured, this allows the observer to detect, verify and/or modify the intended coverage of the composition on the substrate.

In another aspect of the invention, there is provided a method for detecting the presence of a silicone composition which includes providing a silicone composition in accordance with those of the present invention; exposing the composition to a wavelength of light sufficient to trigger an optical response, such as fluorescent color emission by the fluorescent agent and observing the optical response to detect the presence of silicone composition.

DETAILED DESCRIPTION OF THE INVENTION

Compositions

The silicone resin component of the present invention may be any suitable photo-curable silicone polymer known to those skilled in the art. In one aspect, the silicone resin component includes a silicone polymer having a free radical curing group selected from methacryloxy, acryloxy, vinyl, and combinations thereof.

The silicone resin component may include the silicone polymers described above in the patents incorporated by reference, such as those within the general formula:

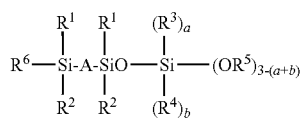

where A represents a polymer or copolymer backbone, which can be any number of combinations of polyurethane, silicone, polyamide, polyether, polyester, and the like; $R^1$ and $R^2$ may be the same or different and are monovalent hydrocarbyl groups having up to 10 carbon atoms, or halo- or cyano-substituted hydrocarbyl groups; $R^3$ and $R^4$ may be the same or different monovalent groups and may contain an ethylenically unsaturated polymerizable double bond; $R^5$ is a methyl, ethyl, isopropyl or —$CH_2CH_2OCH_3$; a is 0, 1, or 2; a+b is 1 or 2; and $R^6$ is a monovalent hydrocarbyl group or

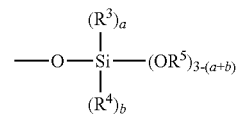

Desirably, the silicones are those which have both moisture and photocuring capabilities. Such desirable silicones may conform to the formula:

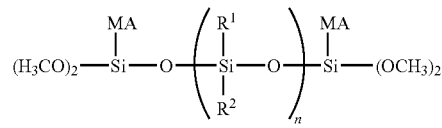

where MA is a methacryloxyalkyl group (such as methacryloxypropyl), $R^1$ and $R^2$ are as described above, and n is from 1 to 1,200.

In one aspect, the silicone polymer includes a moisture-curing group selected from one or more of alkoxy, acetoxy, enoloxy, aryloxy, oxime, amino, N,N-dialkylamino, N,N-dialkylaminoxy, N-alkylamido, and combinations thereof.

Accordingly, compositions of the present invention may also include a moisture-curing catalyst to further enhance or control the cure speed. Non-limiting examples of moisture curing catalysts include a metal compound such as titanium, tin or zirconium. The moisture catalysts are employed in a curingly effective amount, which generally is from about 0.05 to about 5% by weight and desirably about 0.1 to about 2.5%. Tin octoate, tetraisopropoxy titanate and tetrabutoxy titanate are particularly desirable. U.S. Pat. No. 4,111,890 lists numerous other moisture-curing catalysts that are useful.

While the curable silicone component may be made in a variety of ways, one desirable method is that which is described in the '269 patent, which is incorporated herein by reference.

The solid photoinitiator component of the invention may be any suitable solid photoinitiator known to those skilled in the art. Suitable solid photoinitiators include UV photoinitiators, visible light photoinitiators, and combinations thereof. Desirably, the photoinitiator is an acylphosphine oxide photoinitiator. The acylphosphine oxide may be an acylphosphine oxide, a bisacylphosphine oxide, such as diphenyl (2,4,6-trimethoxybenzoyl)phosphine oxide, or a combination thereof. In a desirable aspect, the solid photoinitiator is diphenyl (2,4,6-trimethoxybenzoyl)phosphine oxide.

The solid photoinitiator may be combined with a second photoinitiator different than the solid-photoinitiator. The second photoinitiator may be a UV or visible light photoinitiator and may be selected from a variety of known photoinitiators including benzophenones, acetophenones, substituted acetophenones, benzoin and its alkyl esters, xanthone, substituted xanthones, camphoroquinone peroxyester initiators, 9-fluorene carboxylic acid peroxyester initiators, alkyl thioxanthones such as isopropyl thioxanthone, and combinations thereof.

Specific photoinitiators useful as a second photoinitiator include 2,2 diethoxyacetophenone, benzyldimethyl ketal, 2,2-diethoxy-1,2-diphenylethanone, 1-hydroxy-cyclohexyl-phenyl ketone, .alpha.,.alpha.-dimethoxy-.alpha.-hydroxy acetophenone, 1-(4-isopropylphenyl)-2-hydroxy-2-methyl-propan-1-one, 1-[4-(2-hydroxyethoxy)phenyl]-2-hydroxy-2-methyl-propan-1-one, 2-methyl-1-[4-(methylthio)phenyl]-2-morpholino-propan-1-one, 2-benzyl-2-dimethylamino-1-(4-morpholinophenyl)-butan-1-one, 3,6-bis(2-methyl-2-morpholino-propanonyl)-9-butyl-carbazole, 4,4'-bis(dimethylamino)benzophenone, 2-chlorothioxanthone, 4-chlorothioxanthone, 2-isopropylthioxanthone, 4-isopropylthioxanthone, 2,4-dimethylthioxanthone, 2,4-diethylthioxanthone, 4-benzoyl-N,N-dimethyl-N-[2-(1-oxo-2-propenyl)oxy]ethylbenzenemethanaminium chloride, methyldiethanolamine, triethanolamine, ethyl 4-(dimethylamino) benzoate, 2-n-butoxyethyl 4-(dimethylamino)benzoate and combinations thereof. Desirably, the second photoinitiator is 2,2 diethoxyacetophenone.

The solvent component of the present invention serves to promote compatibility of the solid photoinitiator with the silicone resin component. Phosphine oxides, for example, are frequently not soluble in or miscible with silicones and consequently are generally not useful in such compositions. In silicone compositions which have a high number of methacryl-containing groups present, solubility and/or miscibility is increased, but in such cases, only for relatively small amounts of phosphine oxide. Many commercially available silicone compositions do not have sufficient methacryl content as part of their polymer structure to allow for compatibility with sufficient phosphine oxide to provide a commercially viable product. The solvent may be selected from a wide variety of solvents, and may be unreactive or reactive with the curable silicone. In one aspect of the invention, the solvent is non-polar, such as a silane, a liquid photoinitiator, or a combination thereof. For example, one desirable non-polar solvent classes are liquid UV photoinitiators, such N,N-diethoxyacetophenone, or silanes such as vinyltrimethoxysilane.

Other useful solvents for the solid photoinitiators include those described in U.S. Pat. No. 6,627,672 B1 to Lin et al., the disclosure of which is incorporated herein by reference. Solvents in the '672 patent are described as polar solvents.

The solvent is present in an amount sufficient to render the phosphine oxide alone or in combination with a second photoinitiator compatible with the reactive silicone, i.e., fully or substantially fully miscible into a stable homogenous composition.

The combination of photoinitiators in a solvent or dispersion is desirably added as a premix to the reactive silicone to promote uniformity and miscibility of the resultant composition. Accordingly, in another aspect, the present invention relates to a curable silicone composition including a curable silicone, a cure system including a solid photoinitiator dissolved or dispersed in a liquid photoinitiator, and a fluorescent agent wherein the curable silicone polymer, the solid photoinitiator, the liquid photoinitiator and fluorescent agent are as described herein.

In another aspect, the present invention relates to the reaction product of a curable silicone composition, which includes: a) a silicone polymer as discussed hereinabove; and b) a curable system which includes a solid photoinitiator and a solvent for the solid photoinitiator. Advantageously, the solvent is selected from a liquid photoinitiator, a silane, and combinations thereof. Liquid photoinitiators and silanes useful as solvents for the solid photoinitiator are as discussed hereinabove.

Advantageously, the compositions of the present invention are capable of a CTD up to about 50 mm (millimeters). More desirably, the CTD range is up to about 30 mm. CTD's of 13 mm to 50 mm have been found to be particularly useful and accommodate many applications. The formulation will cure to greater depths when exposed to curing light of higher intensity or for a longer duration. The formulations can be light cured using a variety of equipment. For example, employing a Mercury Arc lamp, Metal Halide, Fusion H, Fusion D or Fusion V bulbs that emit high intensity light in the UVA, UVB, UVC and visible light regions are useful. Examples of useful UV light wavelengths may range from 200 nm to 400 nm, whereas, examples of useful visible light wavelengths may range from 400 nm to 500 nm. Typical light-cure properties may be generated, for example, at an intensity of 70 mW/cm$^2$ for a duration of about 60 seconds, as measured either at 365 nm for UV light or 405 nm for visible light sources. The selection of the cure conditions may vary. The time and intensity, as well as the selected wavelength may vary with the selected composition, depth and type of application. Generally intensities of about 20 to 180 mW/cm$^2$ are practical, as are cure-time duration's from 5 seconds to minutes.

The amounts of the components may vary depending on the desired application. In general, the amount of solid photoinitiator may be in the range of about 0.01% to about 1.0% by weight of the total composition. The non-polar solvent may be present in a range of about 0.5% to about 40% by weight of the total composition, desirably from about 0.5% to about 25% by weight of the total composition, and even more desirably from about 0.5% to about 10% by weight of the total composition.

Visible light photoinitiators may also be included in the compositions of the present invention. Visible light photoinitiators include camphoroquinone peroxyester initiators, 9-fluorene carboxylic acid peroxyester initiators and alkyl thioxanthones, such as isopropyl thioxanthone.

The compositions of the present invention may desirably incorporate a fluorescent agent or dye, which emits a glow when exposed to light of the appropriate wavelength. For purposes of this invention, the term "dye" and "agent" are used interchangeably. The fluorescent dye may be any appropriate fluorescent dye known to those skilled in the art. Because such fluorescent dyes and phosphine oxides frequently absorb light, i.e. UV light, in similar wavelength regions, it would be expected that the presence of a fluorescent dye would adversely affect the depth of cure of the compounds containing a phosphine oxide photoinitiator. However, this was not found to be the case. One useful fluorescent dye is sold by Natmar Services Company under the trade name "Scanning Compound #5"®. Other fluorescent agents useful include Uvitex OB from Ciga Geigy and Keyfluor White CM from Keystone. Although other fluorescent dyes, such as Fluorescent yellow LX 9740 from Pylam products and others are useful, they are less desirable because they add color to the products, which is in most cases, reduces the depth of cure. When depth of cure is of less significance, other dyes which are optionally triggered in the useful wavelength ranges may be used.

The fluorescent dye may be present in amounts sufficient to allow for detection. Desirably, the dye is incorporated in amounts of about 0.002% to about 0.02% by weight of the total composition. More desirably, the dye is present in amounts of about 0.003% to about 0.01%.

A variety of additional useful components may be added to the present inventive compositions, such as fillers, crosslinkers, adhesion promoters, rheology modifiers, plasticizers, initiators, catalysts, and combinations thereof. These additives may be present in amounts suitable to effectuate their intended purpose.

Methods

The present invention also relates to methods of preparing and using the compositions of the invention. The compositions of the invention lend themselves to a wide variety of uses, including, but not limited to, use as: gaskets, particularly cure-in-place gaskets, potting compounds, encapsulants, coatings and sealants, in addition to any other uses noted hereinabove.

In one aspect, the present invention provides a method of preparing a photocurable composition including a) providing a curable silicone polymer; and b) mixing the curable silicone polymer with a (i) cure system comprising a liquid photoinitiator and solid photoinitiator soluble therein; and (ii) a fluorescent dye.

Another aspect of the present invention relates to a method of using a composition of the invention to join and/or seal together two substrates, involving: a) applying the composition to at least one of two substrate surfaces; b) mating the substrate surfaces in an abutting relationship to form an assembly; c) exposing the composition to conditions of cure; and d) maintaining the abutting relationship for a time sufficient to allow the composition to cure.

EXAMPLES

The compositions described below in Table I, II, III, IV & V are representative of the compositions of the invention.

liquid photoinitiators, with and without the fluorescent agent. Compositions G and H show the relative difference in depth of cure by type of phosphine oxide utilized. Compositions I, J, K and L show the effect from using different liquid carriers. Composition J and K show the relationship that more fluorescent agent does reduce the depth of cure property.

Compositions M-R are examples of UV-visible/acetoxy compositions of the present invention which are particularly useful as medium to high strength adhesives in bonding, encapsulating, gasketing or as sealants. Compositions M and N are semi-self leveling, with and without a moisture cure catalyst. Composition M would skin over faster in this example, taking 10 minutes versus taking 60 minutes for composition N. Compositions O, P, Q and R are typical non-flowing composition having high green strengths after light curing. Compositions Q and R show the difference between incorporating fluorescent agent. In comparison, formulations O and P use more of a different size filler yet have better depth of cures, even though they incorporate the fluorescent agent.

Compositions S-V are examples of UV-visible/alkoxy or neutral curing compositions of the present invention which are particularly useful as self-leveling potting compounds, encapsulants or coating adhesives. Compositions S and T show the difference in depth of cure using different phosphine oxide photoinitiators, with and without any polar solvents and fluorescent agent. Compositions U and V show additional improvements in depth of cure utilizing different reactive polymer systems.

Compositions W-DD are examples of UV-visible/alkoxy or neutral curing compositions of the present invention which are particularly useful as medium to high strength adhesives

TABLE 1

| Component | Weight % COMPOSITION | | | | | |
| --- | --- | --- | --- | --- | --- | --- |
| | A | B | C | D | E | F |
| Methacryloxypropyl diacetoxy terminated polydimethyisiloxane (PDMS) | 92.0 | 92.0 | 87.5 | 93.35 | 92.9 | 93.4 |
| Methyl terminated PDMS | 0 | 0 | 5.0 | 0 | 0 | 0 |
| Fumed silica | 4.0 | 4.0 | 4.4 | 4.0 | 5.0 | 4.0 |
| Additional crosslinkers: Methyl-triacetoxysilane, Ethyl-triacetoxysilane and/or di-(t-butoxy) di-acetoxysilane | 2.75 | 3.0 | 2.0 | 1.5 | 1.5 | 1.5 |
| Dibutyltin Dilaurate | 0.1 | 0.1 | 0.1 | 0.05 | 0.1 | 0.1 |
| Solid Components | | | | | | |
| Bis (2,4,6-trimethylbenzoyl)-phenyl phosphine oxide | 0.15 | 0.05 | 0.015 | 0.1 | 0.1 | 0.1 |
| Fluorescent dye | 0.004 | 0.003 | 0.003 | 0.004 | 0.005 | 0 |
| Liquid Carriers | | | | | | |
| 2,2 Diethoxyacetophenone | 0.996 | 0.847 | 0.982 | 0.996 | 0 | 0.5 |
| 2-Hydroxy-2-methyl-1-phenyl-propan-1-one | 0 | 0 | 0 | 0 | 0.395 | 0.4 |
| Depth of Cure (70 mW/cm2 for 60 seconds, mercury arc light source measured at 365 nm) | ≧41 mm | ≧41 mm | ≧41 mm | 50.5 mm | 34.3 mm | 40.1 mm |

Compositions A-L are UV-Visible/acetoxy compositions of the present invention which are particularly useful as self-leveling potting or sealing compounds, encapsulants, coatings or as adhesives. Compositions A, B, C and D show that the depth of cure is still maintained at different levels of the phosphine oxide photoinitiator. Compositions D, E and F show how the depth of cure is affected by using different in bonding, encapsulating, gasketing or as sealants. Compositions W, X and Y are self-leveling compositions that cure equally well utilizing differences in liquid carriers, reactive polymers and with and without the fluorescent agent. Compositions AA, BB, CC and DD are non-flowing compositions that show some of the variation possible and their effect on the depth of cure.

TABLE II

| Component | Weight % COMPOSITION | | | | | |
|---|---|---|---|---|---|---|
| | G | H | I | J | K | L |
| Methacryloxypropyl diacetoxy terminated polydimethylsiloxane (PDMS) | 86.0 | 86.0 | 92.65 | 91.5 | 91.5 | 90.5 |
| Methyl terminated PDMS | 5.0 | 5.0 | 0 | 0 | 0 | 0 |
| Fumed silica | 6.0 | 6.0 | 4.0 | 4.0 | 4.0 | 4.0 |
| Additional crosslinkers: Methyl-triacetoxysilane, Ethyl-triacetoxysilane and/or di-(t-butoxy) di-acetoxysilane | 2.0 | 2.0 | 1.0 | 2.75 | 2.75 | 2.75 |
| Dibutyltin Dilaurate | 0.08 | 0.08 | 0.05 | 0.1 | 0.1 | 0.1 |
| Solid Components | | | | | | |
| Bis (2,4,6-trimethylbenzoyl)-phenyl phosphine oxide | 0 | 0.12 | 0.15 | 0.15 | 0.15 | 0.15 |
| Diphenyl (2,4,6-trimethylbenzoyl) phosphine oxide | 0.12 | 0 | 0 | 0 | 0 | 0 |
| Fluorescent dye | 0.004 | 0.004 | 0.004 | 0.004 | 0.006 | 0.004 |
| Liquid Carriers | | | | | | |
| 2,2 Diethoxyacetophenone | 0.796 | 0.796 | 0.15 | 1.496 | 1.494 | 1.496 |
| Vinyltrimethoxysilane | 0 | 0 | 1.996 | 0 | 0 | 0 |
| Isobornyl acrylate | 0 | 0 | 0 | 0 | 0 | 1.0 |
| Depth of Cure (70 mW/cm2 for 60 seconds, mercury arc light source measured at 365 nm) | 26.4 mm | 36.6 mm | ≧41 mm | 39.3 mm | 36.2 mm | 40.3 mm |

TABLE III

| Component | Weight % COMPOSITION | | | | | |
|---|---|---|---|---|---|---|
| | M | N | O | P | Q | R |
| Methacryloxypropyl diacetoxy terminated polydimethylsiloxane (PDMS) | 85.51 | 87.46 | 77.01 | 77.0 | 79.0 | 73.1 |
| Methyl terminated PDMS | 0 | 0 | 0 | 0 | 0 | 6.0 |
| Fumed silica | 11.0 | 9.0 | 20.0 | 20.0 | 18.0 | 18.0 |
| Additional crosslinkers: Methyl-triacetoxysilane, Ethyl-triacetoxysilane and/or di-(t-butoxy) di-acetoxysilane | 2.5 | 2.6 | 2.0 | 2.0 | 2.0 | 2.0 |
| Dibutyltin Dilaurate | 0.05 | 0 | 0.07 | 0.1 | 0.1 | 0.1 |
| Solid Components | | | | | | |
| Bis (2,4,6-trimethylbenzoyl)-phenyl phosphine oxide | 0.12 | 0.12 | 0.12 | 0.12 | 0.12 | 0.1 |
| Fluorescent dye | 0.003 | 0.003 | 0.003 | 0.003 | 0.004 | 0 |
| Liquid Carriers | | | | | | |
| 2,2 Diethoxyacetophenone | 0.817 | 0.817 | 0.797 | 0.777 | 0.776 | 0.7 |
| Depth of Cure (70 mW/cm2 for 60 seconds, mercury arc light source measured at 365 nm) | 25.0 mm | 23.4 mm | 23.5 mm | 23.7 mm | 14.7 mm | 15.7 mm |

TABLE IV

| Component | Weight % COMPOSITION | | | | | |
|---|---|---|---|---|---|---|
| | S | T | U | V | W | X |
| 3-Methacryloxypropyl dimethoxy terminated polydimethylsiloxane (PDMS) | 68.25 | 75.25 | 91.95 | 0 | 88.0 | 0 |
| 3-Methacryloxymethyl dimethoxy terminated polydimethylsiloxane (PDMS) | 0 | 0 | 0 | 92.25 | 0 | 87.25 |
| Vinyl dimethoxy terminated polydimethylsiloxane (PDMS) | 16.0 | 16.0 | 0 | 0 | 0 | 0 |

TABLE IV-continued

| Component | Weight % COMPOSITION | | | | | |
|---|---|---|---|---|---|---|
| | S | T | U | V | W | X |
| Fumed silica | 4.0 | 4.0 | 4.0 | 4.0 | 8.0 | 8.0 |
| Dibutyltin Dilaurate | 0 | 0 | 0 | 0 | 0.1 | 0 |
| Alkyl tin carboxylate | 0.4 | 0.4 | 0.4 | 0.1 | 0 | 0.1 |
| Solid Components | | | | | | |
| Bis (2,4,6-trimethylbenzoyl)-phenyl phosphine oxide | 0 | 0.1 | 0.15 | 0.15 | 0.1 | 0.15 |
| Diphenyl (2,4,6-trimethylbenzoyl) phosphine oxide | 0.1 | 0 | 0 | 0 | 0 | 0 |
| Fluorescent dye | 0 | 0.004 | 0.004 | 0.004 | 0.005 | 0.004 |
| Liquid Carriers | | | | | | |
| Isobornyl acrylate | 4.0 | 0 | 0 | 0 | 0 | 0 |
| N,N dimethyl acrylamide | 2.0 | 0 | 0 | 0 | 0 | 0 |
| Octyl/decyl acrylate | 1.0 | 0 | 0 | 0 | 0 | 0 |
| 2,2 Diethoxyacetophenone | 0.75 | 0.746 | 0.996 | 0.996 | 0 | 0.996 |
| Methacryloxypropyl-trimethoxysilane | 1.0 | 1.0 | 0 | 0 | 0 | 0 |
| Methacryloxymethyl-trimethoxysilane | 0 | 0 | 0 | 0 | 0 | 1.0 |
| 2-Hydroxy-2-methyl-1-phenyl-propan-1-one | 0 | 0 | 0 | 0 | 0.4 | 0 |
| Vinyltrimethoxysilane | 2.5 | 2.5 | 2.5 | 2.5 | 3.395 | 2.5 |
| Depth of Cure (70 mW/cm2 for 60 seconds, mercury arc light source measured at 365 nm) | 16.5 mm | 25.5 mm | ≧43 mm | ≧41 mm | 32.0 mm | 30.0 mm |

TABLE V

| Component | Weight % COMPOSITION | | | | | |
|---|---|---|---|---|---|---|
| | Y | Z | AA | BB | CC | DD |
| 3-Methacryloxypropyl dimethoxy terminated polydimethylsiloxane (PDMS) | 85.9 | 0 | 0 | 0 | 70.396 | 0 |
| 3-Methacryloxymethyl dimethoxy terminated polydimethylsiloxane (PDMS) | 0 | 78.2 | 74.56 | 72.69 | 0 | 70.596 |
| Fumed silica | 10.0 | 19.6 | 20.78 | 23.0 | 25.0 | 25.0 |
| Tetraisopropoxy titanate | 0 | 0 | 0 | 0.15 | 0 | 0 |
| Alkyl tin carboxylate | 0.1 | 0.11 | 0.16 | 0 | 0.3 | 0.1 |
| Solid Components | | | | | | |
| Bis (2,4,6-trimethylbenzoyl)-phenyl phosphine oxide | 0.1 | 0.13 | 0.16 | 0.15 | 0.1 | 0.1 |
| Fluorescent dye | 0 | 0.003 | 0.004 | 0.01 | 0.004 | 0.004 |
| Liquid Carriers | | | | | | |
| 2,2 Diethoxyacetophenone | 0 | 0.757 | 1.036 | 0 | 0 | 0 |
| Methacryloxypropyl-trimethoxysilane | 1.0 | 0 | 0 | 0 | 0 | 0 |
| Methacryloxymethyl-trimethoxysilane | 0 | 1.2 | 0.95 | 0 | 0 | 0 |
| 2-Hydroxy-2-methyl-1-phenyl-propan-1-one | 0.4 | 0 | 0 | 0 | 0.2 | 0.2 |
| Vinyltrimethoxysilane | 2.5 | 0 | 2.35 | 4.0 | 4.0 | 4.0 |
| Depth of Cure (70 mW/cm2 for 60 seconds, mercury arc light source measured at 365 nm) | 34.5 mm | 30.0 mm | 25.0 mm | 24.0 mm | 22.8 mm | 27.4 mm |

Each of the inventive compositions in Tables I-V were made as follows. First the reinforcement fillers were mixed into the reactive polymer under controlled temperature, from 30° C. to 110° C. depending on the need to dry the filler. The mixing was done for 30 minutes to 2 hours using high shear and vacuum in order to disperse the filler properly. The compositions in Tables I, II & III were then endcapped using a Methacryloxypropyl-triacetoxysilane to produce the reactive polydimethylsiloxane (PDMS), whereas, the compositions in Tables IV & V started with the appropriate reactive PDMS, prior to mixing. The compositions were then cooled to a temperature between 25° C. and 40° C. before adding the other liquid and solid components.

Then a premix was separately prepared including the phosphine oxide/fluorescent agent by combining the solid component with one or more of the liquid carrier components under nitrogen, mixing for about 20 to 60 minutes using heat up to 50° C.

The respective premix and the remaining liquid components and moisture catalyst, shown in Table I to V were then added to the previously formed silicone mixture and blended for a sufficient time, approximately 30 minutes, under vacuum to provide a uniform mixture.

The compositions were then cured using cured with a mercury arc lamp for 60 seconds at 70 mW/cm$^2$ (measured at 365 nm wavelength). The Depth of Cure result for each of the compositions is listed along with the formulations in Tables I to V. An opaque plastic cup having a maximum depth of 41 mm was used for all the samples except composition D where a deeper opaque container was used. As the data indicates, the compositions provide depths of cure from 15 mm to over 50 mm thickness under these conditions.

Each of the inventive compositions were also curable by other light sources as shown in the depth of cure data generated on composition A in Table VI. Composition A was exposed to different UV and visible light sources (mercury arc, metal halide, Fusion D, Fusion H and Fusion V bulbs) at different intensities and time intervals. As shown the inventive compositions were also found to be curable by visible light (e.g. wavelength greater than about 400 nm) equally well. Additionally, increasing the exposure time continues to improve the depth of cure of the compositions, whereas, prior art compositions would reach a maximum cure depth much sooner.

TABLE VI

| Light Source (Lamp) | 70 mW/cm$^2$ for 60 seconds | 70 mW/cm$^2$ for 180 seconds | 180 mW/cm$^2$ for 30 seconds | 180 mW/cm$^2$ for 60 seconds |
|---|---|---|---|---|
| UV Light sources | | | | |
| Mercury Arc | ≧41 mm | — | ≧41 mm | — |
| Fusion D | 29 mm | — | 31 mm | ≧41 mm |
| Fusion H | 37 mm | — | — | — |
| Visible Light sources | | | | |
| Fusion V | 21 mm | — | — | — |
| Metal Halide (visible only) | 26.3 mm | ≧41 mm | — | — |

What is claimed is:

1. A curable silicone composition comprising:
(a) a photo-curable silicone resin having the following structure:

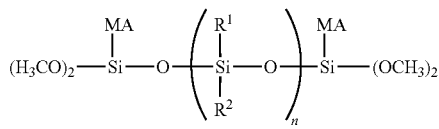

wherein MA is a methacryloxyalkyl group, R$^1$ and R$^2$ may be the same or different and are monovalent hydrocarbyl groups having up to 10 carbon atoms, or halo- or cyano-substituted hydrocarbyl groups, and n is from 1 to 1,200;
(b) an acylphosphine oxide photoinitiator; and
(c) a fluorescent dye in amounts of about 0.002% to 0.006% by weight of the total composition.

2. The composition of claim 1, wherein the photoinitiator is a solid photoinitiator.

3. The composition of claim 1, wherein the photoinitiator is dissolved in a solvent.

4. The composition of claim 1, wherein the photoinitiator is dissolved in a non-polar solvent.

5. The composition of claim 1, wherein the photoinitiator is selected from the group consisting of bisacylphosphine oxide, acylphosphine oxide and combinations thereof.

6. The composition of claim 1, further including a moisture-cure catalyst.

7. The curable silicone composition of claim 1 wherein the composition further comprises a non-polar solvent for the photoinitiator.

8. The composition of claim 7, wherein the non-polar solvent is selected from the group consisting of a silane, a liquid photoinitiator and combinations thereof.

9. The composition of claim 7, wherein the photoinitiator is selected from the group consisting of bisacylphosphine oxide, acylphosphine oxide and combinations thereof.

10. The composition of claim 7, further including a moisture-cure catalyst.

11. The composition of claim 1, wherein the silicone resin comprises a free radical curing group selected from the group consisting of methacryloxy, vinyl and combinations thereof.

12. The composition of claim 1, wherein the silicone resin comprises a moisture-curing group selected from the group consisting of alkoxy, acetoxy, enoloxy, methacryloxy, acryloxy, oxime, vinyl, amino, N,N-dialkylamino, N,N-dialkylaminoxy, N-alkylamido, and combinations thereof.

13. A method of detecting the presence of a silicone composition comprising:
providing a silicone composition according to claim 1;
shining a light of appropriate wavelength to permit absorption by the fluorescent dye; and
observing the subsequent fluorescent emission as an indication of the presence of the silicone composition.

14. A method for using the composition of claim 1 to join and/or seal together two substrates, comprising the steps of:
(a) applying the composition to at least one of two substrate surfaces;
(b) mating the substrate surfaces in an abutting relationship to form an assembly;
(c) exposing the composition to conditions of cure; and
(d) maintaining the abutting relationship for a time sufficient to allow the composition to cure.

15. A curable silicone composition comprising:
(a) a curable silicone resin;
(b) a cure system comprising a premix of an acylphosphine oxide photoinitiator dissolved in a liquid photoinitiator; and
(c) a fluorescent dye in amounts of about 0.002% to 0.006% by weight of the total composition.

16. The composition of claim 15, wherein the acylphosphine oxide photoinitiator is initiated by UV and/or visible light.

17. A curable silicone composition comprising:
(a) a photo-curable silicone polymer;
(b) a fluorescent dye in amounts of about 0.002% to 0.006% by weight of the total composition;
(c) a premix comprising a first photoinitiator comprising a member selected from the group consisting of a bisacylphosphine oxide, acylphosphine oxide and combinations thereof;
a second photoinitiator different from the first; and
at least one non-polar solvent.

18. A dual photo/moisture curing silicone composition having enhanced cure-through-depth comprising:
(a) a photo-moisture curable silicone component having the following structure:

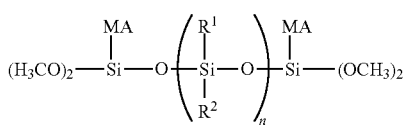

wherein MA is a methacryloxyalkyl group, $R^1$ and $R^2$ may be the same or different and are monovalent hydrocarbyl groups having up to 10 carbon atoms, or halo- or cyano-substituted hydrocarbyl groups, and n is from 1 to 1,200;
  (b) a premix of an acylphosphine oxide photoinitiator in a solvent carrier; and
  (c) a fluorescent dye in amounts of about 0.002% to 0.006% by weight of the total composition.

19. A method of preparing a photo-curable silicone composition comprising:
  (a) providing a photo-curable silicone resin having the following structure:

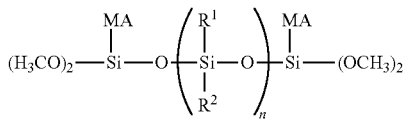

wherein MA is a methacryloxyalkyl group, $R^1$ and $R^2$ may be the same or different and are monovalent hydrocarbyl groups having up to 10 carbon atoms, or halo- or cyano-substituted hydrocarbyl groups, and n is from 1 to 1,200; and
  (b) mixing the curable silicone polymer with an acylphosphine oxide photoinitiator and a fluorescent dye, wherein the fluorescent dye is present in amounts of about 0.002% to 0.006% by weight of the total composition.

20. A composition comprising the reaction product of:
  (a) a photo-curable silicone resin having the following structure:

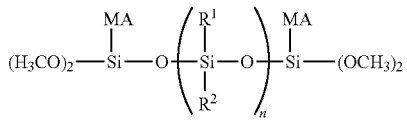

wherein MA is a methacryloxyalkyl group, $R^1$ and $R^2$ may be the same or different and are monovalent hydrocarbyl groups having up to 10 carbon atoms, or halo- or cyano-substituted hydrocarbyl groups, and n is from 1 to 1,200;
  (b) a premix of a solid acylphosphine oxide photoinitiator and a solvent for said solid photoinitiator; and
  (c) a fluorescent dye in amounts of about 0.002% to 0.006% by weight of the total composition.

* * * * *